(12) United States Patent
Sternberger

(10) Patent No.: US 8,002,217 B2
(45) Date of Patent: Aug. 23, 2011

(54) SYSTEM FOR ADJUSTMENT OF THRUST REVERSER PIVOT DOOR

(75) Inventor: Joe E. Sternberger, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 445 days.

(21) Appl. No.: 11/941,647

(22) Filed: Nov. 16, 2007

(65) Prior Publication Data

US 2009/0126151 A1  May 21, 2009

(51) Int. Cl.
*F02K 1/54* (2006.01)

(52) U.S. Cl. ............ 244/110 B; 239/265.29; 239/265.19

(58) Field of Classification Search .............. 244/110 B; 60/226.2, 230; 239/265.19, 265.29; 411/398, 411/169; 280/86.753
See application file for complete search history.

(56) References Cited

U.S. PATENT DOCUMENTS

| | | | |
|---|---|---|---|
| 3,072,423 A * | 1/1963 | Charlton ................... 403/83 |
| 3,163,441 A * | 12/1964 | Traugott ................ 280/86.753 |
| 3,550,855 A * | 12/1970 | Buell et al. .............. 239/265.29 |
| 4,422,605 A * | 12/1983 | Fage ....................... 244/110 B |
| 4,478,455 A * | 10/1984 | Linde ........................ 297/362 |
| 4,519,561 A * | 5/1985 | Timms ................... 244/110 B |
| 4,860,956 A * | 8/1989 | Fage ....................... 239/265.19 |
| 4,894,985 A | 1/1990 | Dubois |
| 4,960,243 A * | 10/1990 | Dubois et al. ........... 239/265.29 |
| 5,039,171 A | 8/1991 | Lore |
| 5,097,661 A * | 3/1992 | Lair et al. .................. 60/226.2 |
| 5,104,141 A * | 4/1992 | Grove et al. ............. 280/86.753 |
| 5,230,213 A * | 7/1993 | Lawson ...................... 60/226.2 |
| 5,392,991 A * | 2/1995 | Gatti et al. .............. 239/265.29 |
| 5,615,834 A * | 4/1997 | Osman ................... 239/265.19 |
| 5,671,598 A * | 9/1997 | Standish .................... 60/226.2 |
| 5,779,192 A * | 7/1998 | Metezeau et al. ......... 244/110 B |
| 5,794,433 A * | 8/1998 | Peters et al. ............... 60/226.2 |
| 5,826,823 A * | 10/1998 | Lymons et al. ........... 244/110 B |
| 5,836,149 A * | 11/1998 | Servanty .................... 60/226.2 |
| 5,937,636 A * | 8/1999 | Gonidec et al. ............. 60/226.2 |
| 6,202,255 B1 * | 3/2001 | Sitter .......................... 16/242 |
| 6,256,979 B1 * | 7/2001 | Fournier et al. ............. 60/226.2 |
| 6,260,801 B1 * | 7/2001 | Peters et al. ............. 244/110 B |
| 6,487,845 B1 * | 12/2002 | Modglin et al. ............. 60/226.2 |
| 6,688,099 B2 * | 2/2004 | Lair ............................. 60/226.2 |
| 6,843,627 B2 * | 1/2005 | Childs et al. ..................... 411/7 |
| 7,146,796 B2 * | 12/2006 | Lair ............................. 60/226.2 |

\* cited by examiner

*Primary Examiner* — Tien Dinh
*Assistant Examiner* — Justin Benedik
(74) *Attorney, Agent, or Firm* — Hovey Williams LLP

(57) ABSTRACT

A system that allows for quick and easy adjustment of the position of a thrust reverser pivot door comprises an actuator rod end bolt and a pair of pivot door hinge pins, all of which have an eccentric element. The actuator rod end bolt includes a cylindrical portion along the center of the length of the bolt that has an eccentric element which protrudes beyond the outer surface of the cylinder. Each pivot door hinge pin includes a cylindrical portion along the center of the length of the pin that has an eccentric element which protrudes beyond the outer surface of the cylinder. Rotation of either the actuator rod end bolt or the pivot door hinge pins or both the actuator rod end bolt and the pivot door hinge pins adjusts the position of the pivot door.

19 Claims, 10 Drawing Sheets

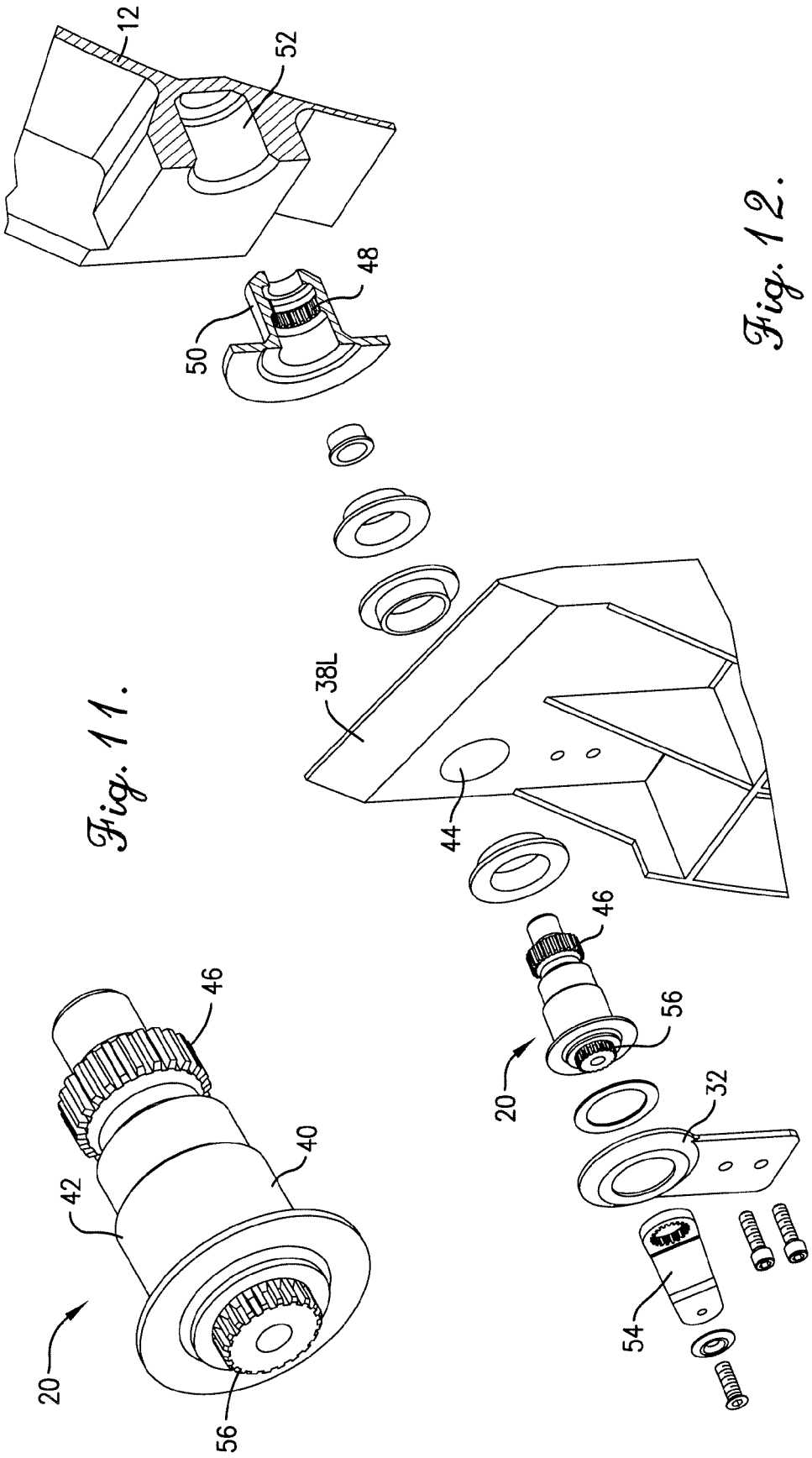

SYSTEM FOR ADJUSTMENT OF THRUST REVERSER PIVOT DOOR

BACKGROUND OF THE INVENTION

1. Field of the Invention

Embodiments of the present invention relate to thrust reverser pivot doors. More particularly, embodiments of the present invention relate to components of a thrust reverser pivot door, such as a pair of hinge pins and an actuator rod end bolt, with an eccentric element that allow for easy adjustment of the pivot door position.

2. Description of the Related Art

Airplane engines on business or regional jets often include pivot door type thrust reversers. Reverse thrust is typically utilized when the airplane is landing and needs to reduce its speed. Reverse thrust of an airplane engine is achieved by opening a pair of pivot doors near the rear of the engine such that the doors redirect the thrust of the engine forward, thereby slowing the plane. When reverse thrust is not needed, the pivot doors are stowed so as to conform with the shape of the engine nacelle. Aerodynamic smoothness of the surface of the nacelle is critical. A mismatch of the periphery of the pivot doors with the nacelle may cause an undesirable drag on the aircraft during flight.

It is necessary when assembly is complete (and occasionally thereafter) to adjust the position of the pivot doors in order to ensure engine nacelle surface smoothness. Conventionally, adjustment methods involve inserting shims into either the forward or aft actuator fittings with their respective structures or the pivot door hinge and the frame of the engine. The process of inserting shims between various components and the structures to which they attach can be time-consuming and require additional assembly labor.

SUMMARY OF THE INVENTION

Embodiments of the present invention solve the above-mentioned problems and provide a distinct advance in the art of the adjustment of thrust reverser pivot doors. More particularly, embodiments of the invention provide a system that allows for quick and easy adjustment of the pivot door position.

Embodiments of the system comprise an actuator rod end bolt and a pair of pivot door hinge pins, all of which have an eccentric element. The actuator rod end bolt couples the aft end of the actuator rod with the attachment fitting of the pivot door. The bolt includes a cylindrical portion along the length of the bolt. The cylindrical portion has an eccentric element which protrudes above a portion the surface of the cylinder, wherein the centerline of the eccentric element is offset from the centerline of the cylinder. Rotation of the bolt effectively adjusts the length of the actuator rod, which thereby adjusts the position of the door in either the forward or aft direction of the engine.

The pivot door hinge pins are located on opposing sides of the pivot door and couple the hinge fitting of the pivot door to the hinge bearing of the engine nacelle fixed structure. The hinge pins provide the points about which the door pivots when it is deployed. Each hinge pin includes a cylindrical portion along the length of the pin. The cylindrical portion has an eccentric element which protrudes above a portion the surface of the cylinder, wherein the centerline of the eccentric element is offset from the centerline of the cylinder. Rotation of the hinge pin adjusts the position of the pivot door with respect to the engine nacelle to ensure the proper fit of the door when it is stowed.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein:

FIG. 11 is an isolated perspective view of a pivot door hinge pin;

FIG. 12 is an exploded view of the pivot door hinge pin assembly;

Figure 1:
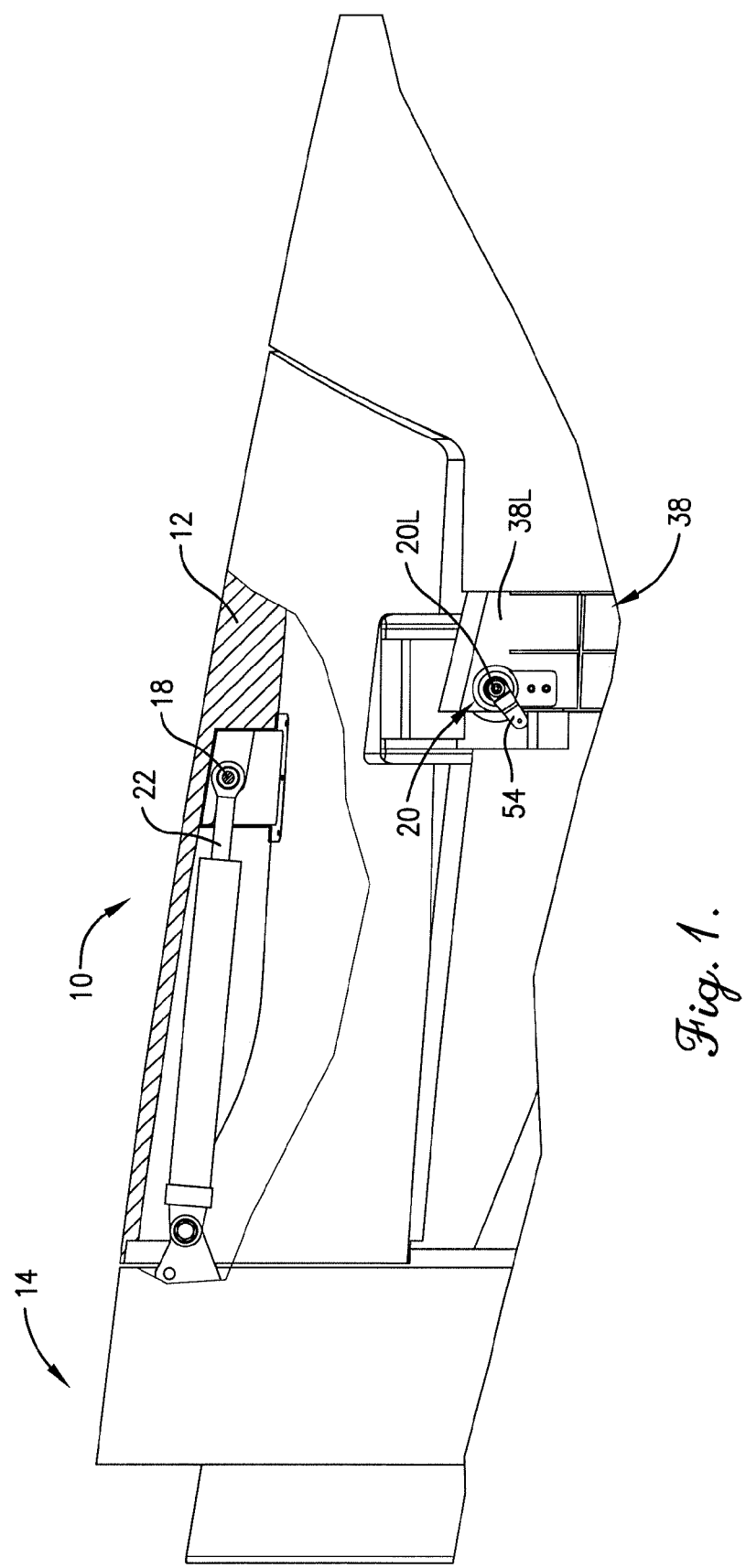
FIG. 1 is a side view of a portion of a thrust reverser pivot door stowed, depicting a portion of a system for adjusting the position of the pivot door.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 2:
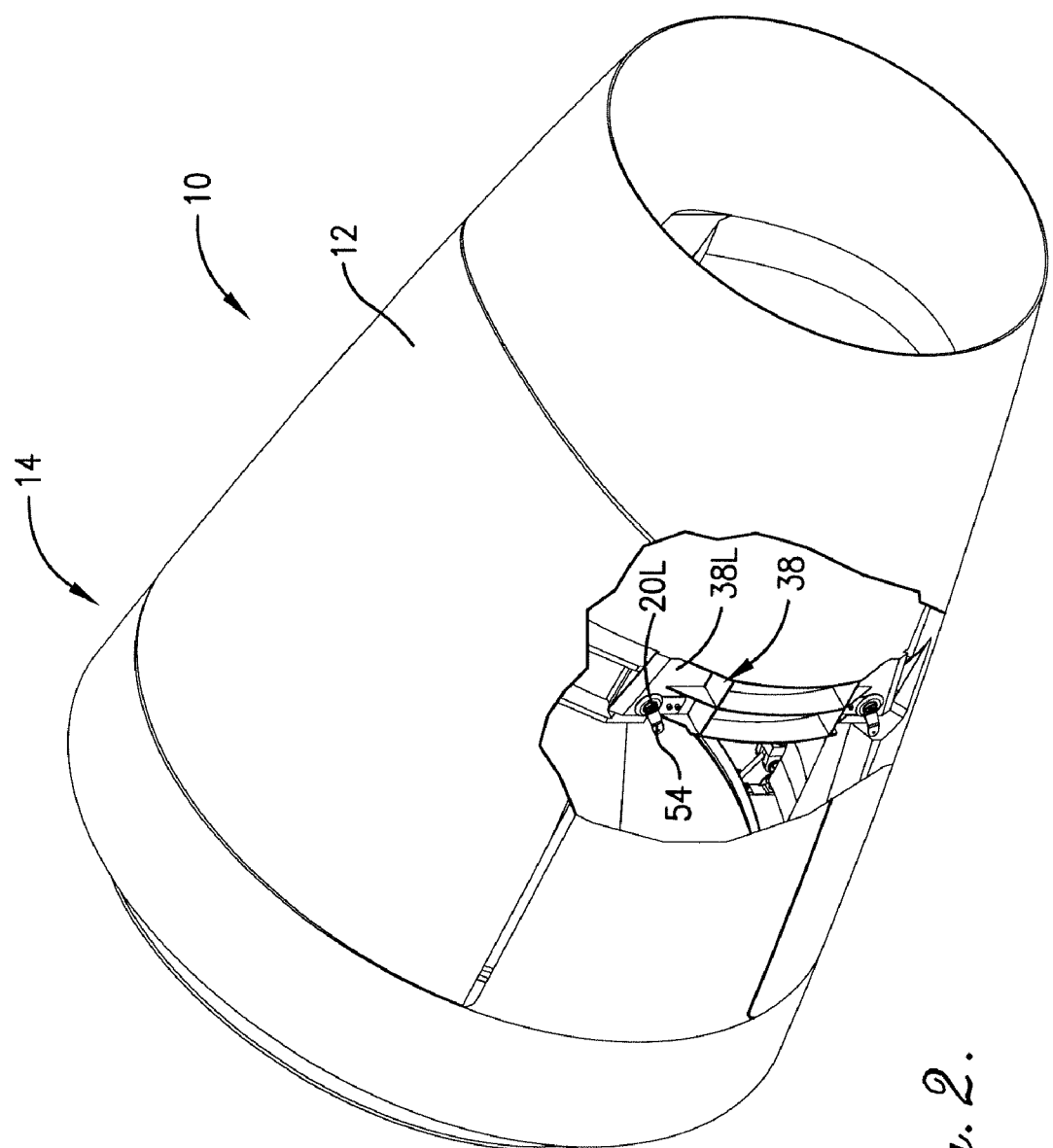
FIG. 2 is a perspective view looking forward, depicting thrust reverser pivot doors in the stowed position.
Figure 3:
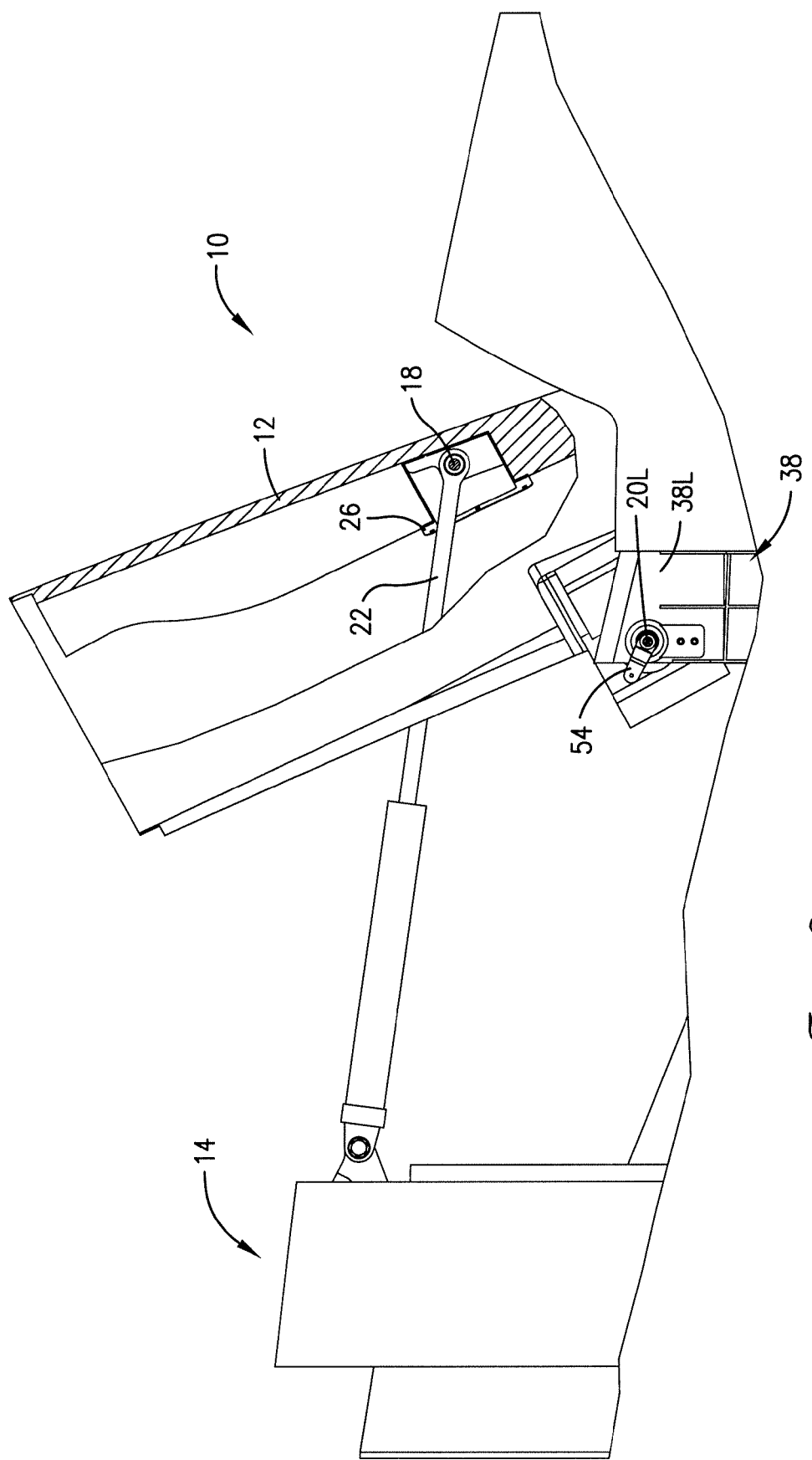
FIG. 3 is a side view of a portion of the thrust reverser with the pivot door deployed, depicting an actuator rod end bolt and a pivot door hinge pin.

In various embodiments, as seen in FIG. 1-FIG. 5, the system 10 is operable to adjust the position of a pivot door 12 of a thrust reverser 14 while the pivot door 12 is in the stowed or closed position, as shown particularly in FIG. 1 and FIG. 2. Adjustment of the position of the pivot door 12 allows the perimeter of the pivot door 12 to align with the opening in a thrust reverser 14 to achieve aerodynamic smoothness of the outer surface of the thrust reverser 14.

Figure 4:
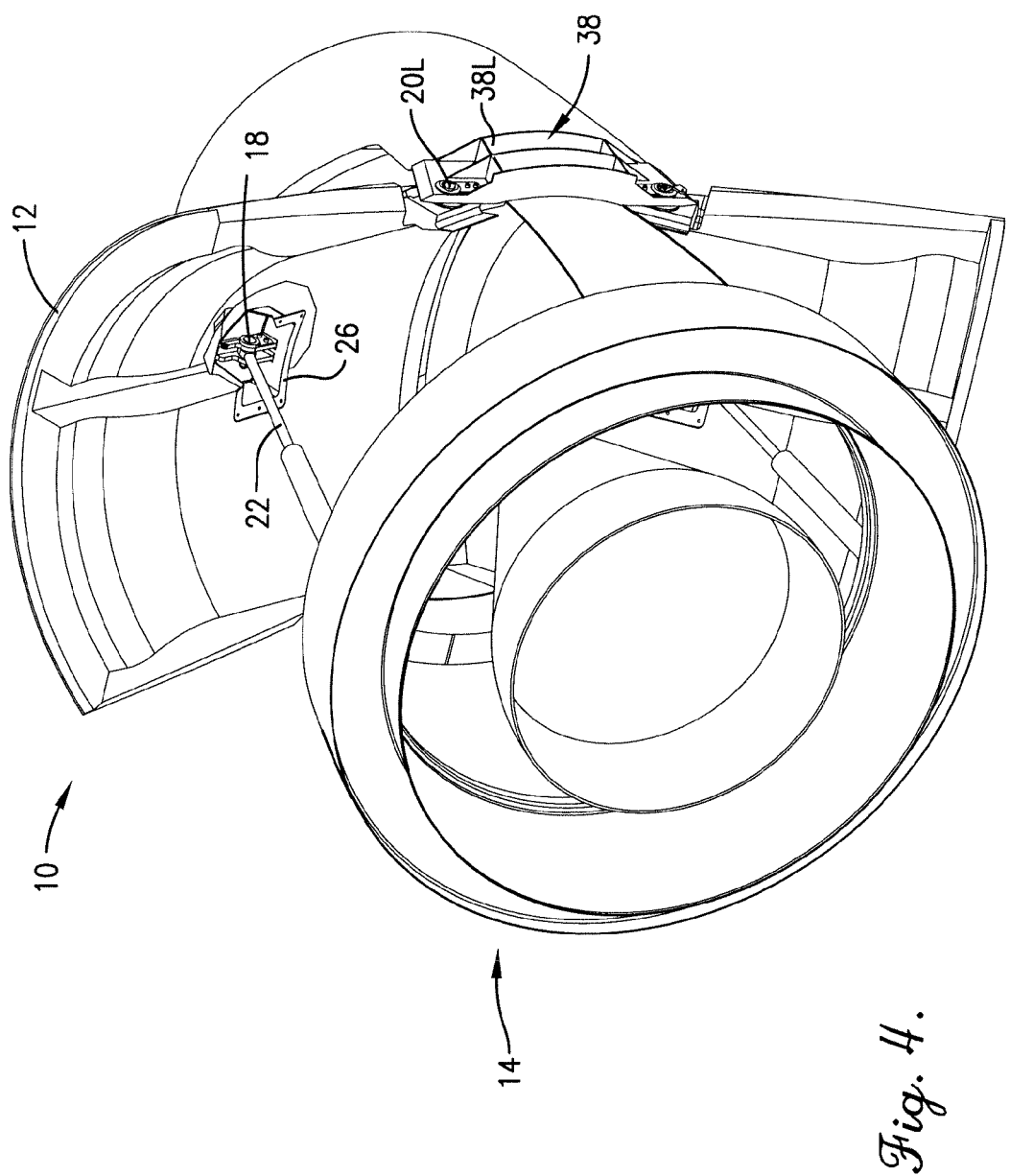
FIG. 4 is a perspective view of a portion of the thrust reverser, from forward of the engine looking aft, with the pivot doors deployed, showing the actuator rod end bolt and the pivot door hinge pin.
Figure 5:
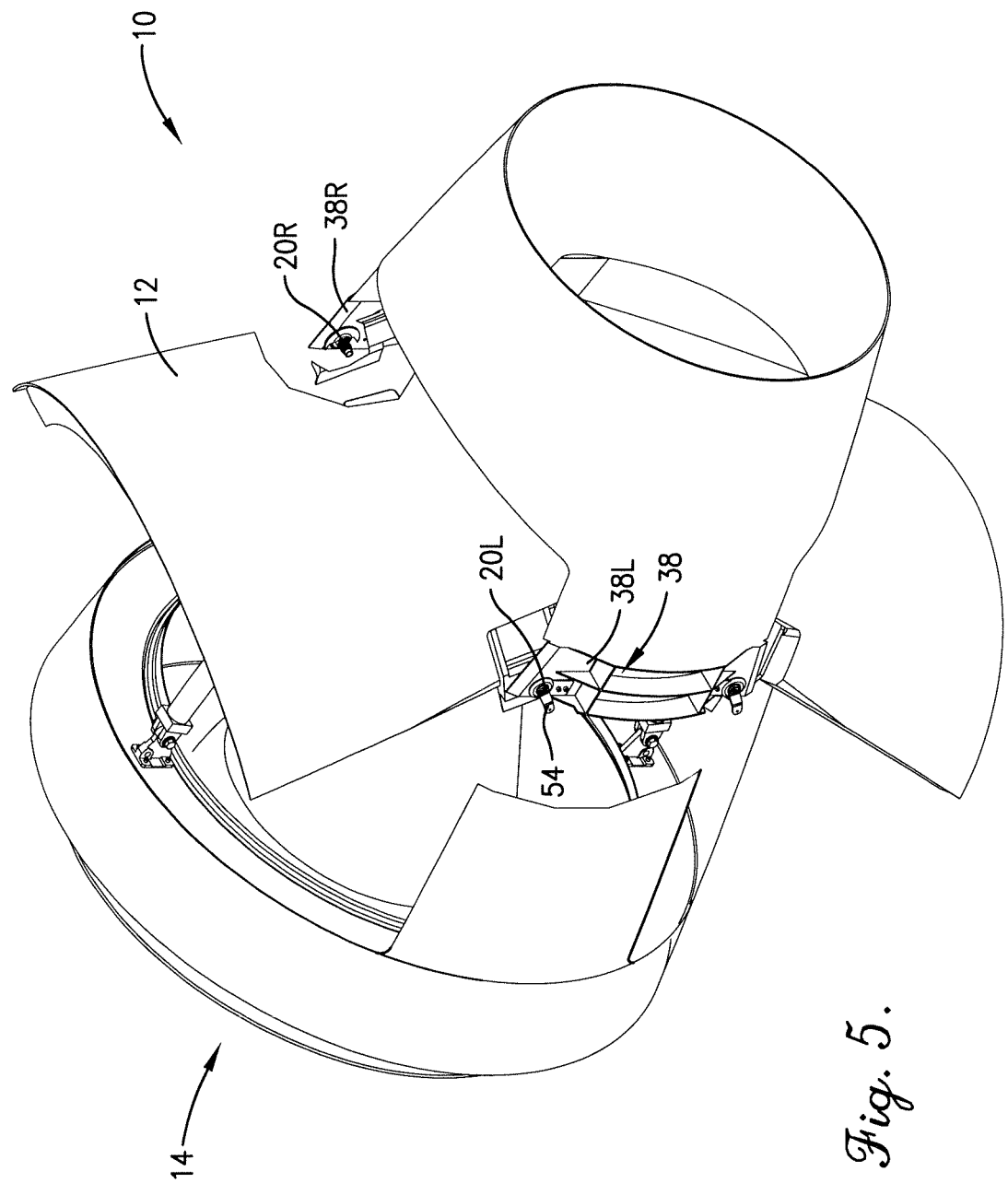
FIG. 5 is a perspective view of a portion of the thrust reverser, with the pivot doors in the deployed position, that includes a cutaway of the pivot door to reveal pivot door hinge pins on both sides of the engine.
Figure 6:
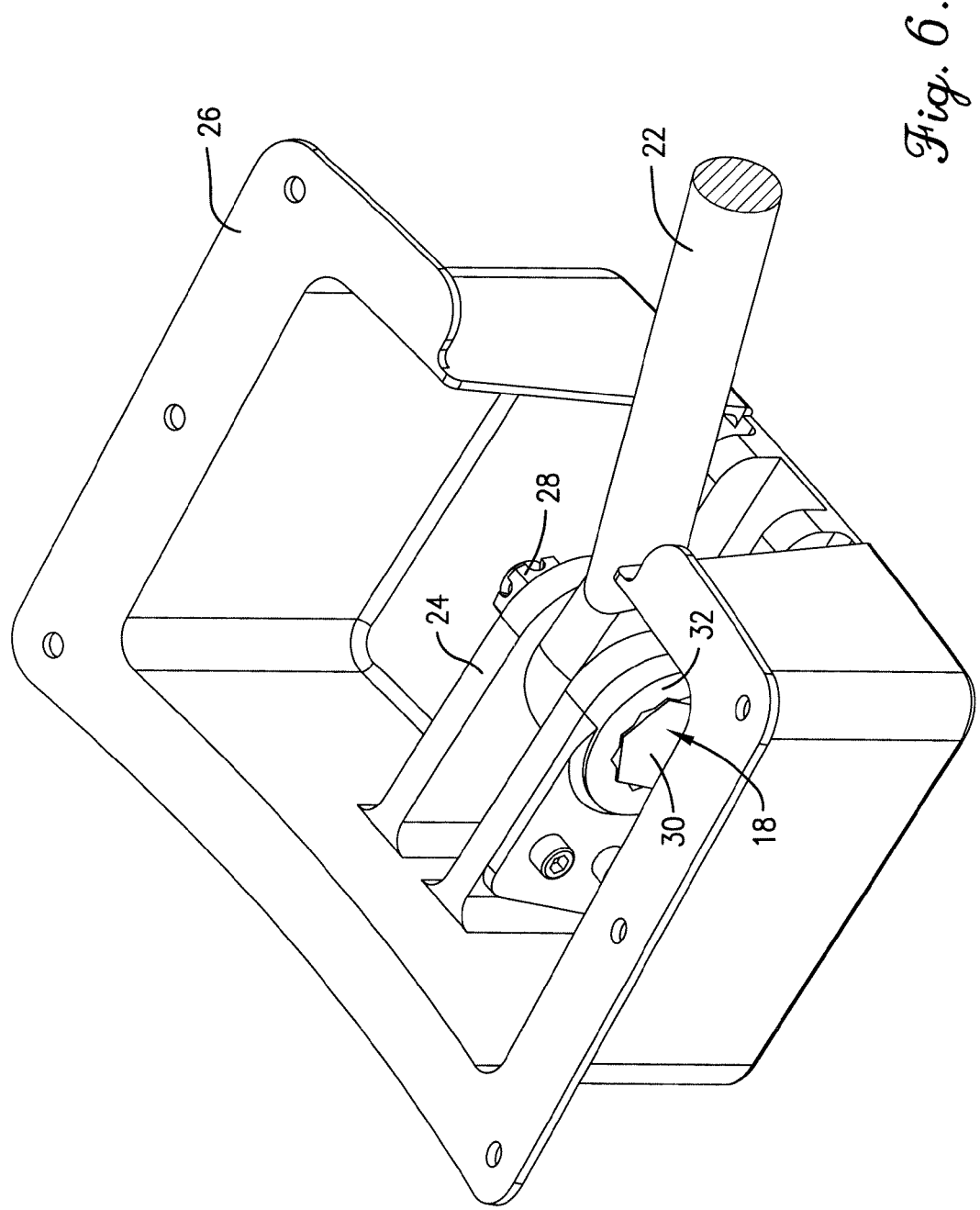
FIG. 6 is a perspective view of an attachment fitting housing from the pivot door depicting the actuator rod end bolt.
Figure 7:
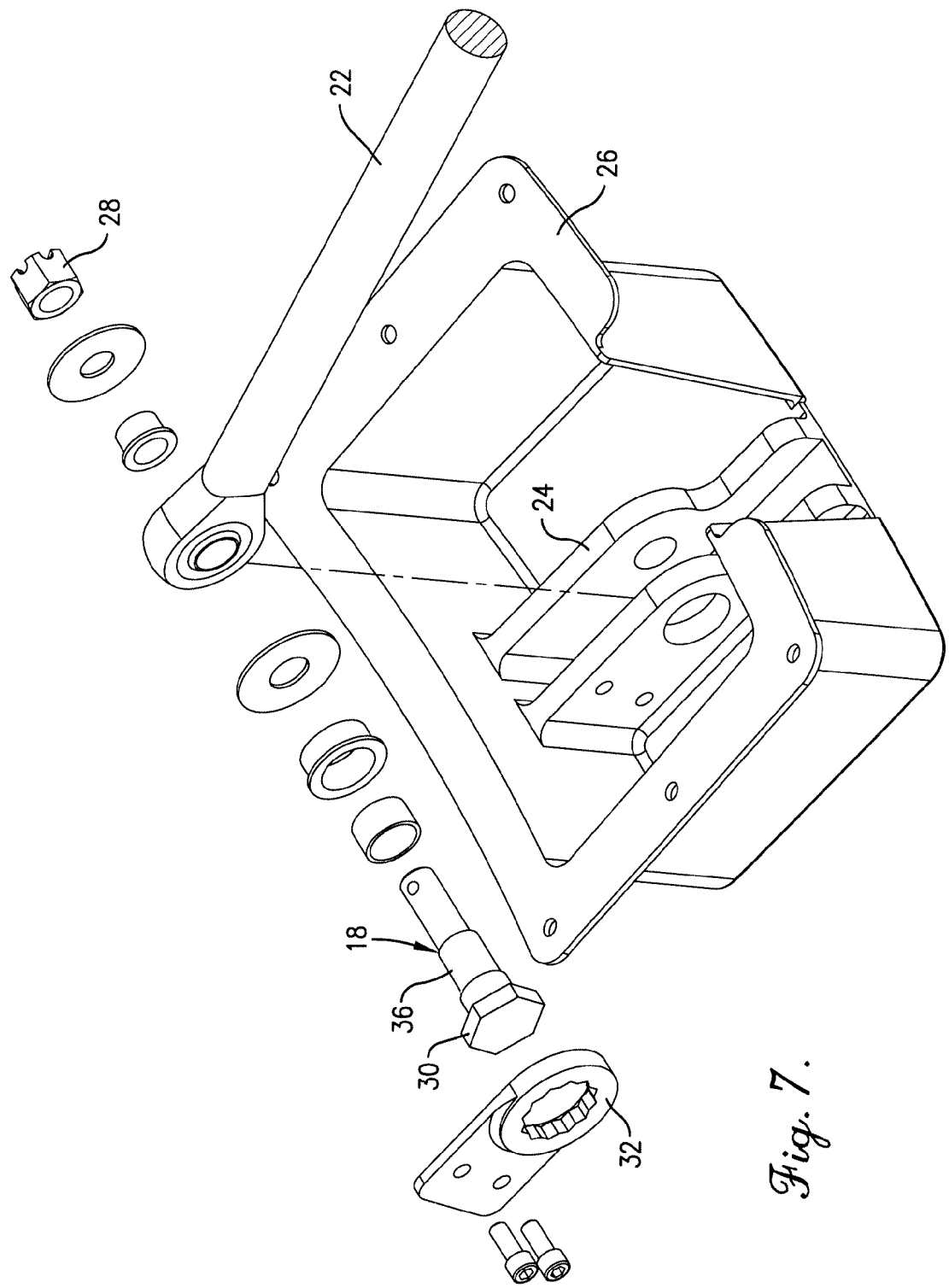
FIG. 7 is a perspective view of the attachment fitting housing that includes an exploded assembly view of the actuator rod end bolt coupled to an actuator rod.
Figure 8:
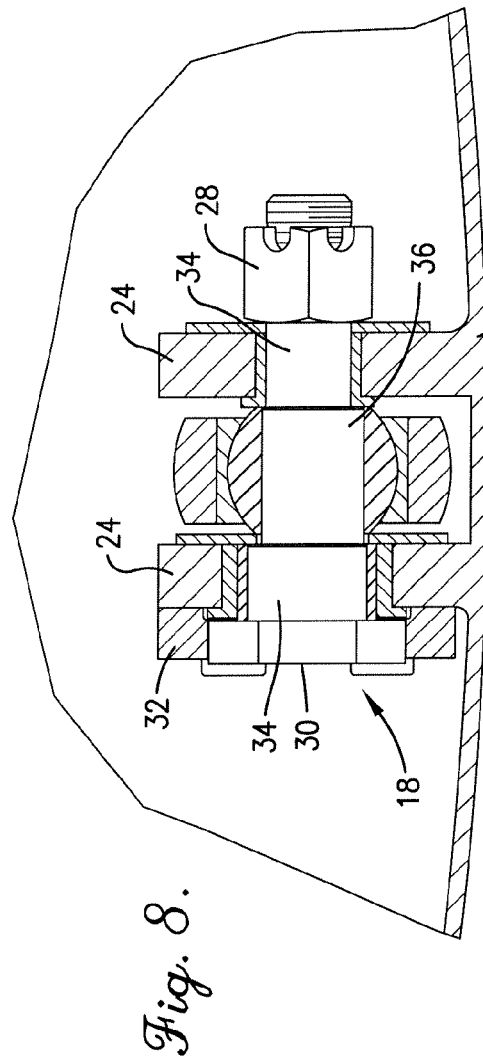
FIG. 8 is a plan view of the actuator rod end bolt coupled to the attachment fitting.

In various embodiments, the system 10 comprises an actuator rod end bolt (or coupling bolt) 18 and a pair of pivot door hinge pins 20. As seen in FIG. 6-FIG. 8, the actuator rod end bolt 18 fits through a round opening in the aft end of an actuator rod 22 and couples the actuator rod 22 to an attachment fitting 24 that is connected to an attachment fitting housing 26. The bolt 18 may be secured in place by a nut 28. Furthermore, there may be additional hardware such as washers or bushings that accompany the actuator rod end bolt 18 and the actuator rod 22, when the bolt 18 and rod 22 are coupled with the fitting 24. The attachment housing 26 is generally firmly attached to the inner side of the pivot door 12, as shown in FIG. 4. The actuator rod end bolt 18 provides the point about which the actuator rod 22 rotates when the pivot door 12 deploys.

In various embodiments, the actuator rod end bolt 18 includes a bolt head 30 that is held in place by a double hexagonal socket 32, which is rigidly connected to the attachment fitting 24. In some embodiments, the bolt head 30 may be hexagonal shaped which allows the bolt 18 to be rotated within the attachment fitting 24 in 60° increments. In other embodiments, the actuator rod end bolt head 30 is double hexagonal shaped which may allow the bolt 18 to be rotated within the attachment fitting 24 in 30° increments. To rotate the bolt 18, the double hexagonal socket 32 is removed from the attachment fitting 24. In some instances, the nut 28 may need to be loosened slightly. The bolt 18 may then be rotated to the desired position and the socket 32 may be reattached and the nut 28 may be retightened.

Figure 10:
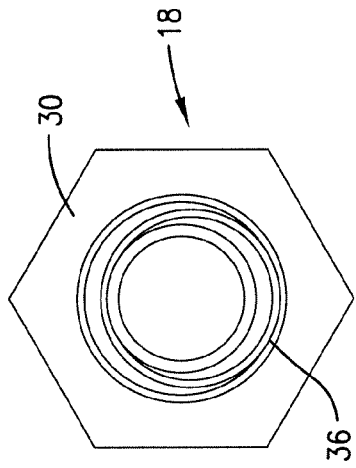
FIG. 10 is an end view of the actuator rod end bolt.
Figure 9:
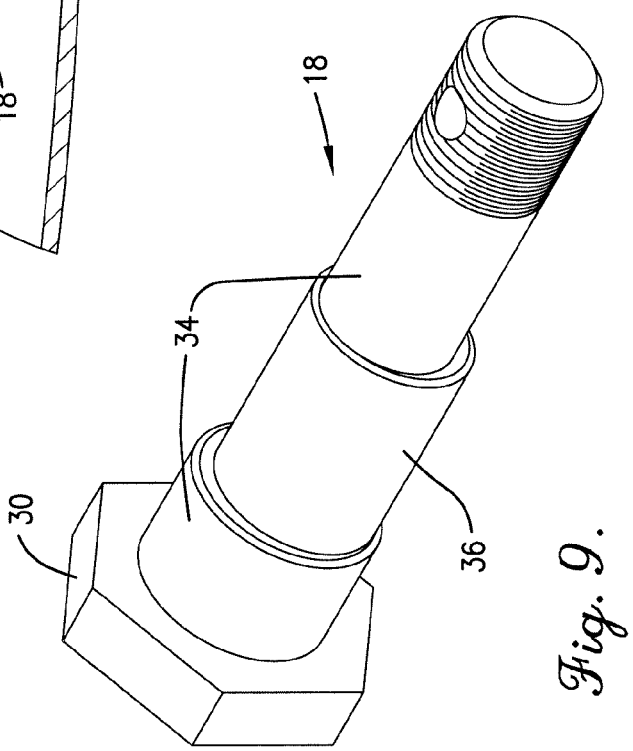
FIG. 9 is an isolated perspective view of the actuator rod end bolt depicting an eccentric component.

The bolt 18 is generally elongated and includes a cylindrical portion 34 along the length of the bolt 18, as seen in FIG. 9. The cylindrical portion 34 has an eccentric element 36 which protrudes above a portion the surface of the cylinder 34, wherein the centerline of the eccentric element 36 is offset from the centerline of the cylinder 34, as shown in FIG. 9 and FIG. 10. The offset of the eccentric element 36 from the center line of the cylindrical portion 34 is approximately 0.025 inches. The eccentric element 36 of the bolt 18 is positioned in the opening of the end of the actuator rod 22 and rotation of the bolt 18 effectively adjusts the length of the actuator rod 22, which thereby adjusts the position of the door 12 in either the forward or aft direction of the thrust reverser 14.

Figure 13:
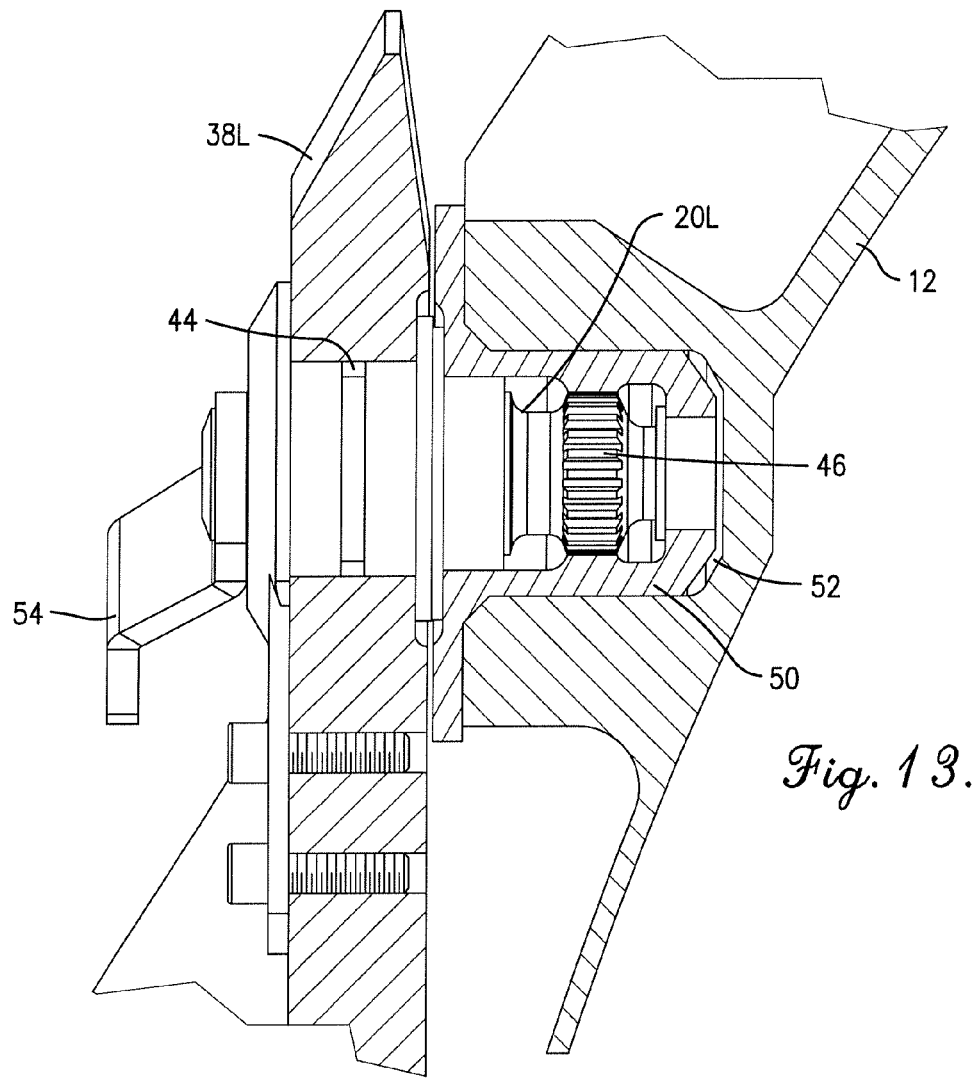
FIG. 13 is a sectional view of the pivot door hinge pin, a side beam, and the pivot door.

In various embodiments, the pivot door hinge pin 20, shown in FIG. 11, is mounted in a side beam 38 of the thrust reverser 14 and is operable to couple the side beam 38 to the pivot door 12, as seen in FIG. 12 and FIG. 13. There are two hinge pins 20 per pivot door 12—one pin 20L to couple a left side beam 38L to the door 12, and one pin 20R to couple a right side beam 38R to the door 12. The pivot door hinge pins 20 also serve as the point of rotation about which the pivot door 12 pivots when the pivot door 12 opens and closes.

Figure 14:
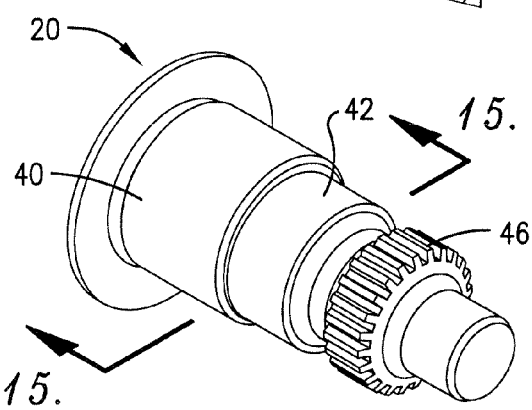
FIG. 14 is an isolated perspective view of a pivot door hinge pin, depicting an eccentric component.
Figure 15:
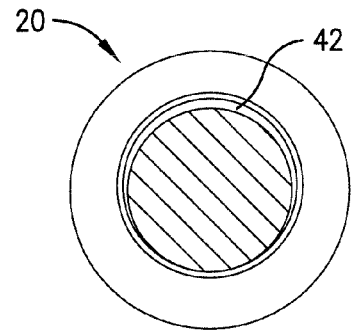
FIG. 15 is a sectional view of the pivot door hinge pin cut along line 15 of FIG. 14, depicting the eccentric component.

In various embodiments, each hinge pin 20 is generally elongated and includes a cylindrical portion 40 along the length of the pin 20, as shown in FIG. 14. The cylindrical portion 40 has an eccentric element 42, which protrudes above a portion the surface of the cylinder 40, wherein the centerline of the eccentric element 42 is offset from the centerline of the cylinder 40, as seen in FIG. 14 and FIG. 15. The offset of the eccentric element 42 from the centerline of the cylindrical portion 40 is approximately 0.025 inches. The eccentric element 42 is positioned in an opening 44 in the side beam 38 when the thrust reverser 14 is assembled.

In various embodiments, the hinge pin 20 includes a splined portion 46 at the distal end which mates with a splined portion 48 in a bearing retainer 50. The retainer 50 is housed within a cavity 52 in the pivot door 12. The system 10 also includes a crank arm 54 that is coupled to a splined portion 56 at the proximal end of the hinge pin 20 and is operable to facilitate rotation of the hinge pin 20. The crank arm 54 acts to control a linear variable transducer (not shown) when the pivot door 12 opens. The hinge pin 20 is installed in one of two positions, giving two positions of the eccentric element 42 that allow for a ±0.025 inch adjustment of the pivot door 12 in the vertical direction.

Other hardware, such as washers, bushings, bolts, and nuts, may be included to secure the hinge pin 20 to the side beam 38 and the pivot door 12, as shown in FIG. 12.

Although the invention has been described with reference to the preferred embodiment illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for adjusting a position of a pivot door of a thrust reverser, the system comprising:
    a pair of hinge pins, operable to adjust the position of the pivot door by rotation of the hinge pins, the hinge pins located on opposing sides of the pivot door, each hinge pin including a hinge pin eccentric element;
    a coupling bolt, operable to adjust the position of the pivot door by adjusting the length of an actuator rod, the coupling bolt located at the aft end of the actuator rod and including a coupling bolt eccentric element and a head at one end of the coupling bolt; and
    a socket rigidly attached to a fitting in the pivot door, the socket operable to retain the head of the coupling bolt to prevent rotation of the coupling bolt.

2. The system of claim 1, wherein each hinge pin couples a hinge fitting of the pivot door to a hinge bearing of an engine nacelle fixed structure.

3. The system of claim 1, wherein each hinge pin further includes a cylindrical section coaxial to the length of the hinge pin.

4. The system of claim 3, wherein the hinge pin eccentric element protrudes above a portion of the surface of the cylindrical section, such that a centerline of the hinge pin eccentric element is offset from a centerline of the cylindrical section.

5. The system of claim 1, wherein the coupling bolt couples the aft end of the actuator rod with an attachment fitting of the pivot door.

6. The system of claim 1, wherein the coupling bolt further includes a cylindrical section coaxial to the length of the coupling bolt.

7. The system of claim 6, wherein the coupling bolt eccentric element protrudes above a portion of the surface of the cylindrical section, such that a centerline of the coupling bolt eccentric element is offset from a centerline of the cylindrical section.

8. The system of claim 1, wherein the coupling bolt head is hexagonal, allowing for the rotation of the coupling bolt in approximately 60-degree increments.

9. The system of claim 1, wherein the coupling bolt head is double hexagonal, allowing for the rotation of the coupling bolt in approximately 30-degree increments.

10. The system of claim 1, wherein the head of the coupling bolt is temporarily removed from the socket to adjust the length of the actuator rod.

11. The system of claim 1, wherein each hinge pin further includes a first spline positioned at a first end of the hinge pin and configured to mate with a retainer that couples the hinge pin to the pivot door, such that the hinge pin rotates only with the pivot door, and a second spline positioned at a second end of the pin and configured to couple with a crank arm that is coupled to a linear variable transducer that determines the rotational position of the pivot door.

12. A system for adjusting a position of a pivot door of a thrust reverser, the system comprising:
   a pair of hinge pins, operable to adjust the position of the pivot door by rotation of the hinge pins, the hinge pins located on opposing sides of the pivot door, each hinge pin including
      a hinge pin cylindrical section coaxial to the hinge pin, and
      a hinge pin eccentric element that protrudes above a portion of the surface of the hinge pin cylindrical section, such that a centerline of the hinge pin eccentric element is offset from a centerline of the hinge pin cylindrical section; and
   a coupling bolt, operable to adjust the position of the pivot door by adjusting the length of an actuator rod, the coupling bolt located at the aft end of the actuator rod and including
      a coupling bolt cylindrical section coaxial to the coupling bolt, and
      a coupling bolt eccentric element that protrudes above a portion of the surface of the coupling bolt cylindrical section, such that a centerline of the coupling bolt eccentric element is offset from a centerline of the coupling bolt cylindrical section, and
      a head at one end of the coupling bolt; and
   a socket rigidly attached to a fitting in the pivot door, the socket operable to retain the head of the coupling bolt to prevent rotation of the coupling bolt.

13. The system of claim 12, wherein each hinge pin couples a hinge fitting of the pivot door to a hinge bearing of an engine nacelle fixed structure.

14. The system of claim 12, wherein the coupling bolt couples the aft end of the actuator rod with an attachment fitting of the pivot door.

15. The system of claim 12, wherein the coupling bolt head is hexagonal, allowing for the rotation of the coupling bolt in approximately 60-degree increments.

16. The system of claim 12, wherein the coupling bolt head is double hexagonal, allowing for the rotation of the coupling bolt in approximately 30-degree increments.

17. The system of claim 12, wherein the head of the coupling bolt is temporarily removed from the socket to adjust the length of the actuator rod.

18. The system of claim 12, wherein each hinge pin further includes a first spline positioned at a first end of the hinge pin and configured to mate with a retainer that couples the hinge pin to the pivot door, such that the hinge pin rotates only with the pivot door, and a second spline positioned at a second end of the pin and configured to couple with a crank arm that is coupled to a linear variable transducer that determines the rotational position of the pivot door.

19. A system for adjusting a position of a pivot door of a thrust reverser, the system comprising:
   a pair of hinge pins, operable to adjust the position of the pivot door by rotation of the hinge pins, the hinge pins located on opposing sides of the pivot door, each hinge pin coupling a hinge fitting of the pivot door to a hinge bearing of an engine nacelle fixed structure and including
      a hinge pin cylindrical section coaxial to the hinge pin,
      a hinge pin eccentric element that protrudes approximately 0.025 inches above a portion of the surface of the hinge pin cylindrical section, such that a centerline of the hinge pin eccentric element is offset from a centerline of the hinge pin cylindrical section, the eccentric element operable to couple to the pivot door, such that rotation of the eccentric element provides a maximum adjustment of approximately 0.025 inches of the pivot door in the vertical direction,
      a first spline positioned at a first end of the hinge pin and configured to mate with a retainer that couples the hinge pin to the pivot door, such that the hinge pin rotates only with the pivot door, and
      a second spline positioned at a second end of the pin and configured to couple with a crank arm that is coupled to a linear variable transducer that determines the rotational position of the pivot door;
   a coupling bolt, operable to adjust the position of the pivot door by adjusting the length of an actuator rod, the coupling bolt coupling the aft end of the actuator rod with an attachment fitting of the pivot door and including
      a coupling bolt cylindrical section coaxial to the coupling bolt, and
      a coupling bolt eccentric element that protrudes above a portion of the surface of the coupling bolt cylindrical section, such that a centerline of the coupling bolt eccentric element is offset from a centerline of the coupling bolt cylindrical section and
      a head at one end of the coupling bolt; and
   a socket ridgidly attached to a fitting in the pivot door the socket operable to retain the head of the coupling bolt to prevent rotation of the coupling bolt,
   wherein the head of the coupling bolt is temporarily removed from the socket to adjust the length of the actuator rod.

* * * * *